United States Patent
Paul et al.

(10) Patent No.: US 9,379,606 B2
(45) Date of Patent: Jun. 28, 2016

(54) DISCRETE NARROW-BAND SWITCHING FREQUENCY AVOIDANCE OF A SWITCH MODE POWER CONVERTER

(71) Applicant: Apple Inc., Cupertino, CA (US)

(72) Inventors: Rajarshi Paul, Fremont, CA (US); Parin Patel, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 306 days.

(21) Appl. No.: 13/905,506

(22) Filed: May 30, 2013

(65) Prior Publication Data

US 2014/0354257 A1 Dec. 4, 2014

(51) Int. Cl.
*H02M 1/44* (2007.01)
*H02M 3/156* (2006.01)
*H02M 1/00* (2006.01)

(52) U.S. Cl.
CPC ............... *H02M 3/156* (2013.01); *H02M 1/44* (2013.01); *H02M 2001/0032* (2013.01); *Y02B 70/16* (2013.01)

(58) Field of Classification Search
CPC H02M 1/44; H02M 3/156; H02M 2001/0032
See application file for complete search history.

(56) References Cited

U.S. PATENT DOCUMENTS

| 7,061,780 | B2 | 6/2006 | Yang et al. | |
|---|---|---|---|---|
| 2003/0194971 | A1* | 10/2003 | Hoyt et al. | 455/63.1 |
| 2006/0067093 | A1* | 3/2006 | Tanaka et al. | 363/41 |
| 2012/0068737 | A1 | 3/2012 | Tuten | |
| 2012/0153919 | A1 | 6/2012 | Garbossa et al. | |
| 2012/0223691 | A1 | 9/2012 | Weinstein et al. | |
| 2013/0038310 | A1 | 2/2013 | Menegoli et al. | |
| 2013/0279203 | A1* | 10/2013 | Nishijima | H02M 3/335 363/20 |
| 2014/0035628 | A1* | 2/2014 | Oaklander | H02K 17/063 327/109 |
| 2014/0055117 | A1* | 2/2014 | Elwan et al. | 323/311 |
| 2014/0078784 | A1* | 3/2014 | Nishijima | 363/21.01 |

OTHER PUBLICATIONS

Stone, David, et al., "Random Carrier Frequency Modulation of PWM Waveforms to Ease EMC Problems in Switched Mode Power Supplies", Power Electronics and Drive Systems, Proceedings of 1995 International Conference, Feb. 21-24, 1995, IEEE Catalogue No. 95TH8025, ISBN: 0-7803-2423-4, (pp. 16-21).
Tao, Chengwu, "A Low-Noise PFM-Controlled Buck Converter for Low-Power Applications", IEEE Transactions on Circuits and Systems-I: Regular Papers, vol. 59, No. 12, Dec. 2012, (pp. 3071-3080).
Heydari, Payam, et al., "Analysis of Jitter Due to Power-Supply Noise in Phase-Locked Loops", *IEEE Custom Integrated Circuits*, (2000), Dec. 4, 2000; pp. 443-446.
Shah, "Power Supply Noise and Clock Generator", *Cypress Semiconductor White Paper*, (Jul. 31, 2014), 5, pp. 1-5.

\* cited by examiner

*Primary Examiner* — Harry Behm
(74) *Attorney, Agent, or Firm* — Blakely, Sokoloff, Taylor & Zafman LLP

(57) ABSTRACT

The switching frequency of a switch mode PFM power converter is compared with a predetermined frequency range that contains the operating frequency of a nearby clocked subsystem. In response to the switching frequency coming into the range, a parameter of the power converter is changed from an original value, so as to cause the switching frequency to go out of the range.

24 Claims, 6 Drawing Sheets

DISCRETE NARROW-BAND SWITCHING FREQUENCY AVOIDANCE OF A SWITCH MODE POWER CONVERTER

An embodiment of the invention relates to switch mode dc-dc power converter circuits used in battery powered, portable electronic devices. Other embodiments are also described.

BACKGROUND

In the realm of battery powered, portable consumer electronic devices such as smart phones, laptop computers and tablet computers, there are a number of sensitive electronic sub-systems that operate relatively tight timing margins, based on a clock signal. Examples of such sub-systems are an applications processor (or system-on-a-chip), a cellular phone network communications interface, a digital camera, a touchscreen, and various sensors such as a proximity sensor and an inertial sensor. Furthermore, such sub-systems often need to be located very close to each other, due to the limited space that is available within the outer enclosure or package of such devices. As a result, it is desirable to reduce electromagnetic noise or interference (EMI) that could be due to the magnetic fields generated by the inductors of switch mode power converters. Otherwise, EMI could present a problem when the fundamental or operating clock frequency of a subsystem is very close to (or aligned with) the switching frequency of the power transistors of a nearby power converter.

A switch mode power converter, such as dc-dc voltage regulator, is sometimes operated in Pulse Frequency Modulation (PFM) mode (i.e., not a fixed frequency pulse width modulation (PWM) mode) in order to improve its efficiency under light load conditions. Typical implementations include, Burst Mode, Pulse Skip Mode etc. where the switching frequency varies with the load current and other operating parameters while at the same time maintaining a regulated DC output voltage. The switch mode controller varies the switching frequency as a function of the load (as well as other parameters) while at the same time maintaining a regulated DC output voltage. For a load that can range for example anywhere from zero to several hundred milliAmps, the converter exhibits a very broad range of power transistor switching frequency, for example from 0 Hz into the MHz range, and also varying inductor magnetic field ripple. Thus, potentially interfering signals are generated over a very wide frequency range.

One possible solution to the problem of EMI generation and susceptibility within portable devices is to add EMI shielding between the power converter circuitry and nearby sensitive circuits, or to at least position the inductors of the power converter away from the sensitive circuits. That however may not be practical within space-constrained, portable devices especially tablet computers and smartphones. Other solutions to the problem may lie in the use of spread spectrum techniques where the total switching noise power is spread across a wider frequency range (by for example randomizing a switching parameter of the power converter), so that noise power at the operating frequency of a nearby subsystem is reduced. The trade off in the spread spectrum approach however is that the noise floor is raised.

SUMMARY

An embodiment of the invention is an adaptive circuit or process for use inside a battery powered portable electronic device. The adaptive circuit deterministically avoids alignment of a changing switching frequency $F_s$ of a switch mode power converter in the device running in PFM mode, with the operating frequency, e.g. a clock frequency, of one or more other sub-systems in the device. Once given knowledge of the operating frequency of a particularly sensitive subsystem, the circuit automatically adapts the switch mode power converter so that its changing $F_s$ (which changes as a function of the load and of certain input parameters, like input voltage, regulated output voltage, inductor current limit, and inductance— see Equation 2 below) does not come too close to the subsystem operating frequency. This reduces the chance of EMI interfering with the sub-system.

Adaptation of the power converter should have little impact on the converter's power efficiency (during PFM mode), and its power consumption overhead should be minimized, in view of its operation in a battery powered portable device. In one embodiment, the $F_s$ is accurately monitored using a particularly low power, direct analog approach. When the monitored $F_s$ encroaches into a discrete or narrow, predetermined "forbidden" range, for example one that is about centered at a known operating or fundamental clock frequency of a nearby and sensitive clocked sub-system, plus a tolerance band or variation, such as due to manufacturing process, supply voltage, and temperature (PVT variation), the adaptive circuit responds to this by changing an input parameter of the converter by a small amount, that is just enough to induce the converter to change its $F_s$ away from the forbidden range. In one embodiment, the switching frequency "skips" over the range; in another embodiment, the switching frequency "backs away" from the range. In both instances, the converter avoids switching its power transistors at the operating frequency of the sensitive sub-system. Examples of the converter's changeable input parameter include inductor current limit, power transistor control pulse on-time, pulse off-time, and burst mode burst count.

The forbidden frequency range for $F_s$ should be kept narrow, because it is desirable to minimize upsetting the converter's "normal" control of $F_s$ in order keep its efficiency as high as possible, especially while operating under battery power. As a result, sufficient accuracy in monitoring $F_s$ is needed to be able to then avoid a very narrow forbidden range, and this may be achieved by directly monitoring $F_s$ using an analog circuit approach.

The above summary does not include an exhaustive list of all aspects of the present invention. It is contemplated that the invention includes all systems and methods that can be practiced from all suitable combinations of the various aspects summarized above, as well as those disclosed in the Detailed Description below and particularly pointed out in the claims filed with the application. Such combinations have particular advantages not specifically recited in the above summary.

BRIEF DESCRIPTION OF THE DRAWINGS

The embodiments of the invention are illustrated by way of example and not by way of limitation in the figures of the accompanying drawings in which like references indicate similar elements. It should be noted that references to "an" or "one" embodiment of the invention in this disclosure are not necessarily to the same embodiment, and they mean at least one.

DETAILED DESCRIPTION

Several embodiments of the invention with reference to the appended drawings are now explained. Whenever the shapes, relative positions, and other aspects of the parts described in the embodiments are not clearly defined, the scope of the invention is not limited only to the parts shown, which are meant merely for the purpose of illustration. Also, while numerous details are set forth, it is understood that some embodiments of the invention may be practiced without these details. In other instances, well-known circuits, structures, and techniques have not been shown in detail so as not to obscure the understanding of this description.

Figure 1:
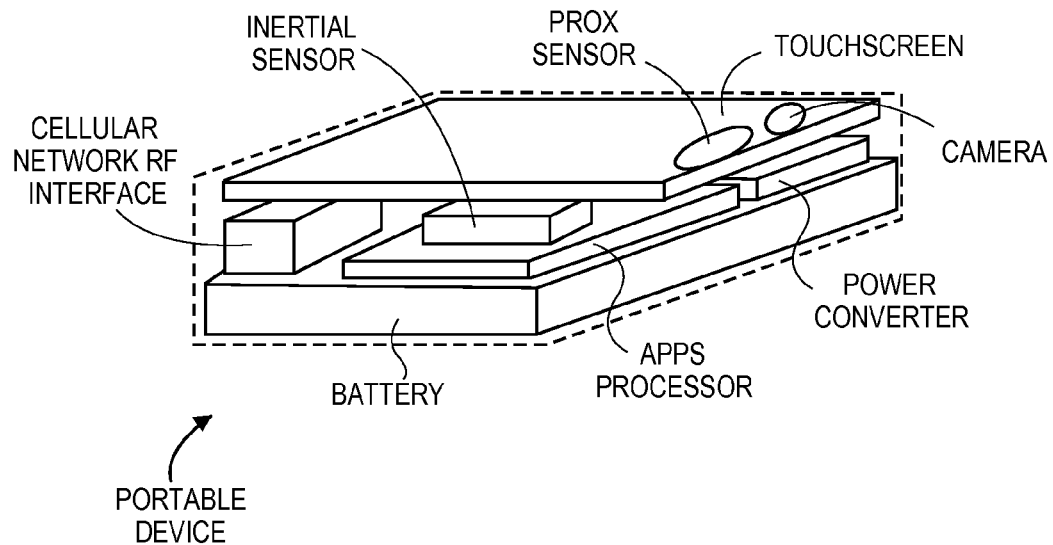
FIG. 1 depicts an arrangement of a portable electronic device that is space constrained and in which an embodiment of the invention that may be implemented.

FIG. 1 shows an example portable electronic device in which an embodiment of the invention may be implemented. While some of the benefits of the invention are more apparent in such devices, an embodiment of the invention may also find use in non-portable electronic devices, such as desktop computers. The portable device has an external or outer housing (shown in dotted lines) in which are installed a number of sub-systems including, in this example, an applications processor, a cellular network RF interface, a digital camera, a touch screen, a proximity sensor and an inertial sensor. These sub-systems may be found in a typical smart phone or tablet computer that also contains a rechargeable battery to power all of the sub-systems shown. In other portable devices, some of these sub-systems may, of course, be absent. One or more of such clocked sub-systems may be sensitive to EMI from a nearby power converter. The power converter may be a DC-DC down converter or boost converter that is also installed in the housing of the portable device and that provides a regulated DC supply voltage to one or more of the sub-systems. The power converter performs power switching that could generate EMI or noise that interferes with the sub-systems that are very close to it. An embodiment of the invention automatically "adapts" the power converter during its otherwise normal operation, so that the converter is less likely to generate noise that is at an operating frequency or fundamental clock frequency of a nearby sub-system.

Figure 2:
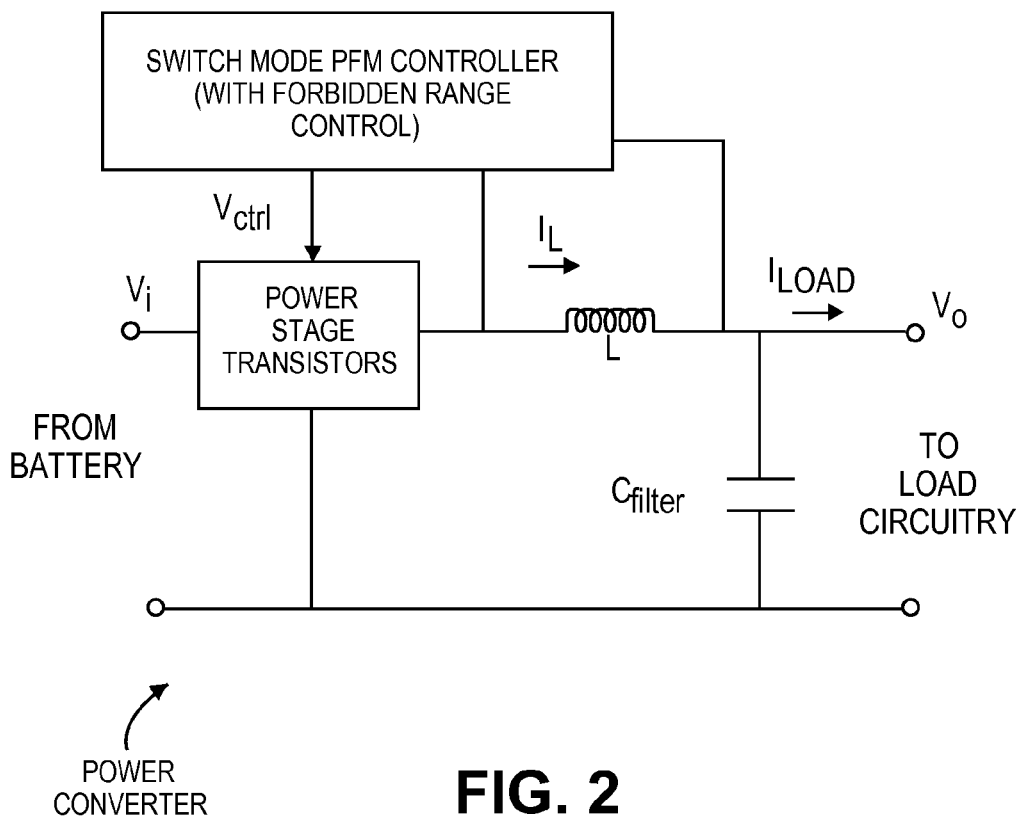
FIG. 2 is a combined block and circuit schematic diagram of a switch mode power converter.

Turning now to FIG. 2, a block diagram combined with a circuit schematic of a DC-DC power converter is shown. The converter produces a regulated output voltage, $V_o$, by converting power from an input port that is at a DC input voltage, $V_i$. In the example shown, the input voltage, $V_i$, is obtained from a rechargeable battery. It should, however, be noted that the embodiments of the invention described here that enable controlling the switching frequency of the power converter could also be used with non-portable devices, including, for example, desktop computers and other consumer electronic devices that have their sub-systems arranged very close to each other due to, for example, space constraints, and in which there may be limited ability to insert EMI shielding material between a sensitive sub-system and the power converter. The power converter has a switch mode controller that may, for example, operate in accordance with a buck converter topology or a boost converter topology. The controller generates transistor pulse control signals (generally referred to here by the label $V_{ctrl}$) that are applied to the power stage transistors, to switch them on and off rapidly according to an algorithm that obtains feedback of the output voltage, $V_o$. Regulation of $V_o$ is achieved under varying $V_i$ and load. An inductor L is used as an energy storage element that conducts an inductor current, $I_L$, that is being switched by the transistor power stage. A further energy storage device referred to as $C_{filter}$ is provided to smooth out the switching-induced ripple in $V_o$. The load current is indicated in FIG. 2 as being drawn by load circuitry that may include one or more of the sub-systems shown in FIG. 1.

Figure 3:
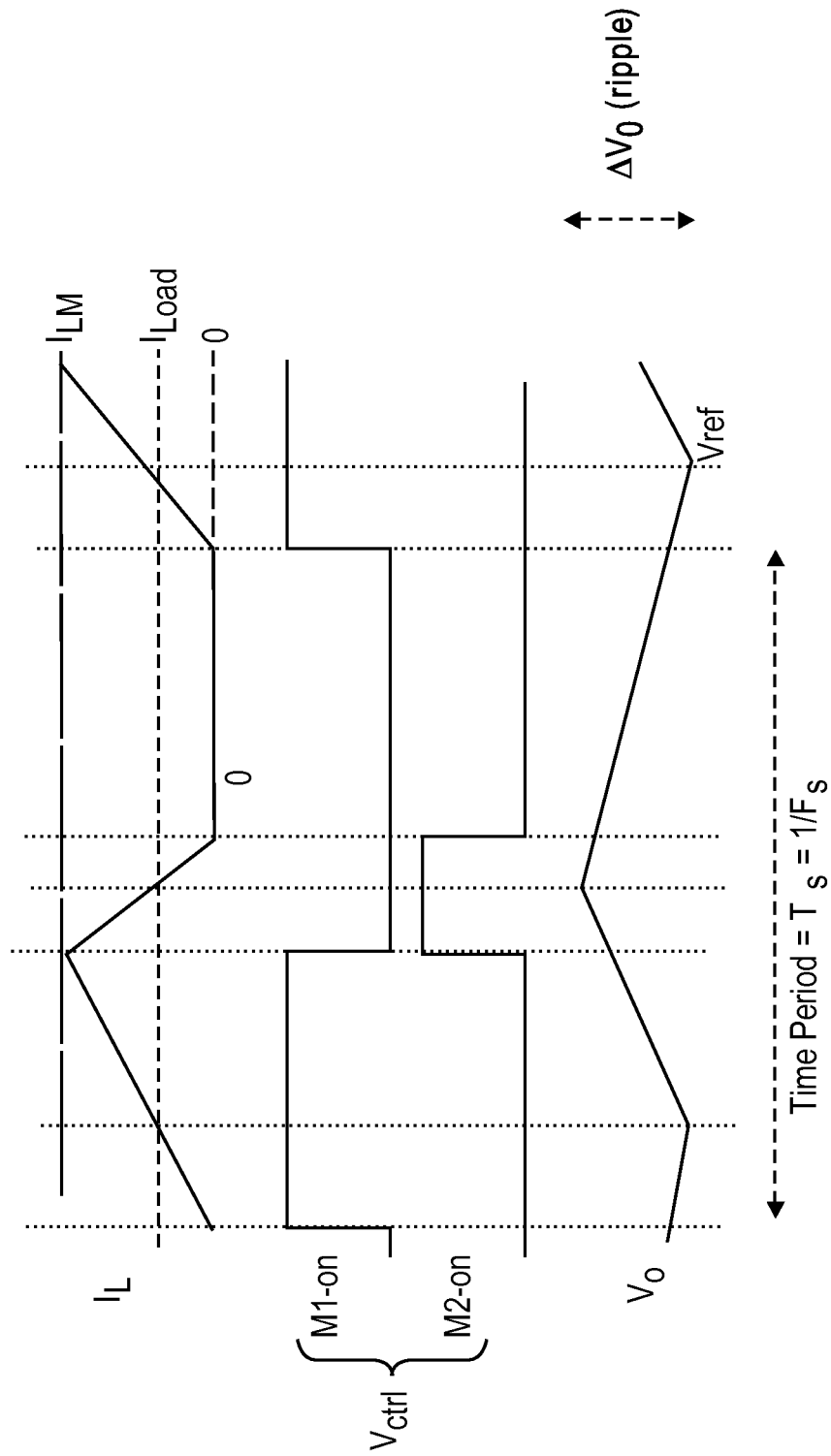
FIG. 3 shows several waveforms of a switch mode power converter.
Figure 4:
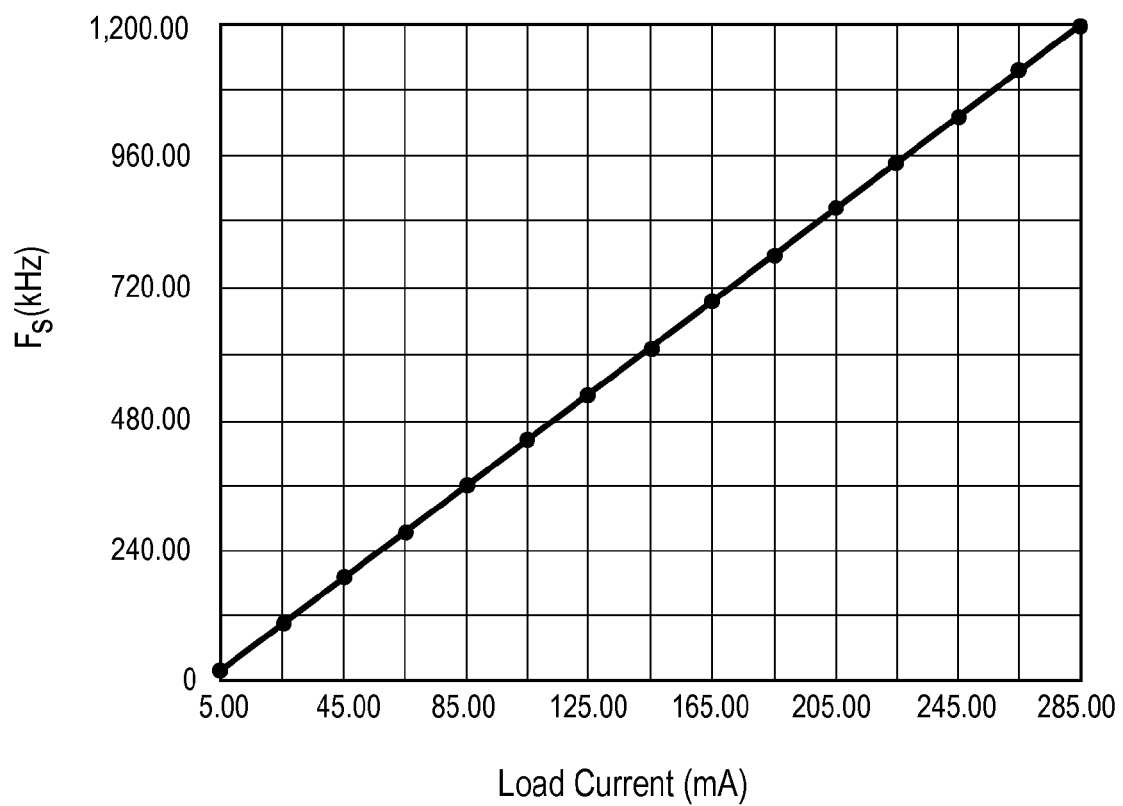
FIG. 4 illustrates an example of how the switching frequency in a PFM switch mode power converter changes as a function of its load current.

Operation of the power converter of FIG. 2 may be illustrated using an example, whose typical waveforms are shown in FIG. 3. It can be seen that in this case, the inductor current $I_L$ has a triangular or saw tooth shape, and which may drop to zero (although in other switch mode topologies it does not) during a switching cycle. The current ramps up when a high side transistor M1 (not shown) in the power stage is turned on until the inductor current reaches its current limit $I_{LM}$, and ramps down when the high side transistor is turned off and a low side transistor M2 (not shown) is turned on. Note that in some embodiments, there may not be a low side transistor M2. The varying inductor current enables an average load current $I_{load}$ to become available for the load circuitry. The switch mode controller will automatically respond to the output voltage $V_o$ depicted in FIG. 3 along with its ripple $\Delta V_o$, and will increase the switching frequency $F_s$ until a reference voltage $V_{ref}$ is met at the output. The figure shows an implementation of a PFM converter that is based on inductor current limit. However, in the context of PFM mode of operation, the switch mode controller may maintain the pulse-on/pulse-off of Vctrl as constant, while varying the switching frequency $F_s$ to provide the needed load current. FIG. 4 illustrates an example variation of $F_s$ in a PFM controller as a function of load current. It can be seen that a relatively wide frequency range is covered by $F_s$, namely from about zero Hz to over one MHz, as the load current varies from, in this particular example, 5 to 285 milliamps (mA). Of course, this is just an example; any numerical ranges given as an example should not be considered as limiting the scope of the invention. What is apparent from FIG. 4 is that with such a switch mode power converter, it is very likely that there may be several clocked sub-systems whose operating clock frequency is in the full range of $F_s$. A technique that can adapt the converter to avoid several known target frequencies (of nearby sensitive sub-systems) is needed which is also power efficient given the need for operating the converter in battery powered devices.

An embodiment of the invention is a process for operating a PFM switch mode converter, and particularly one that is in a battery powered portable electronic device, by monitoring the switching frequency $F_s$ and comparing the monitored frequency with a predetermined, discrete or narrow forbidden frequency range that may be centered at about a known operating frequency of a clocked sub-system (that is also in the portable electronic device). In response to detecting that the monitored frequency has come into the predetermined forbidden range, a parameter of the power converter is automatically changed, thereby causing the switching frequency $F_s$ to go out of the forbidden range. It should be noted that while the switching frequency $F_s$ is defined in FIG. 3 as being inversely proportional to the period of the power transistor switching control signal $V_{ctrl}$, the switching frequency may alternatively refer to the frequency of a current waveform through a power conductor L. The switching frequency could also appear as a frequency of the voltage ripple $\Delta V_o$. There is a need to force the switching frequency $F_s$ to avoid an operating frequency, or fundamental clock frequency, of a nearby sub-system, but to do so without impacting, or minimizing the impact to, the efficiency of normal operation and output voltage ripple of the switch mode converter.

As part of the solution suggested above, it can be shown, at least to a first order of analysis and based on analyzing, for example, the geometry of the waveforms in FIG. 3, that the ripple $\Delta V_o$ and the switching frequency $F_s$ may be related by the following equations:

$$\Delta V_0 = \frac{1}{2}\frac{L}{C}\frac{V_i}{(V_i - V_o)V_o}(I_{LM} - I_{Load})^2 \quad \text{(Equation 1)}$$

$$F_S = \frac{2(V_i - V_o)V_o}{V_i L I_{LM}^2}I_{Load} \quad \text{(Equation 2)}$$

Figure 5:
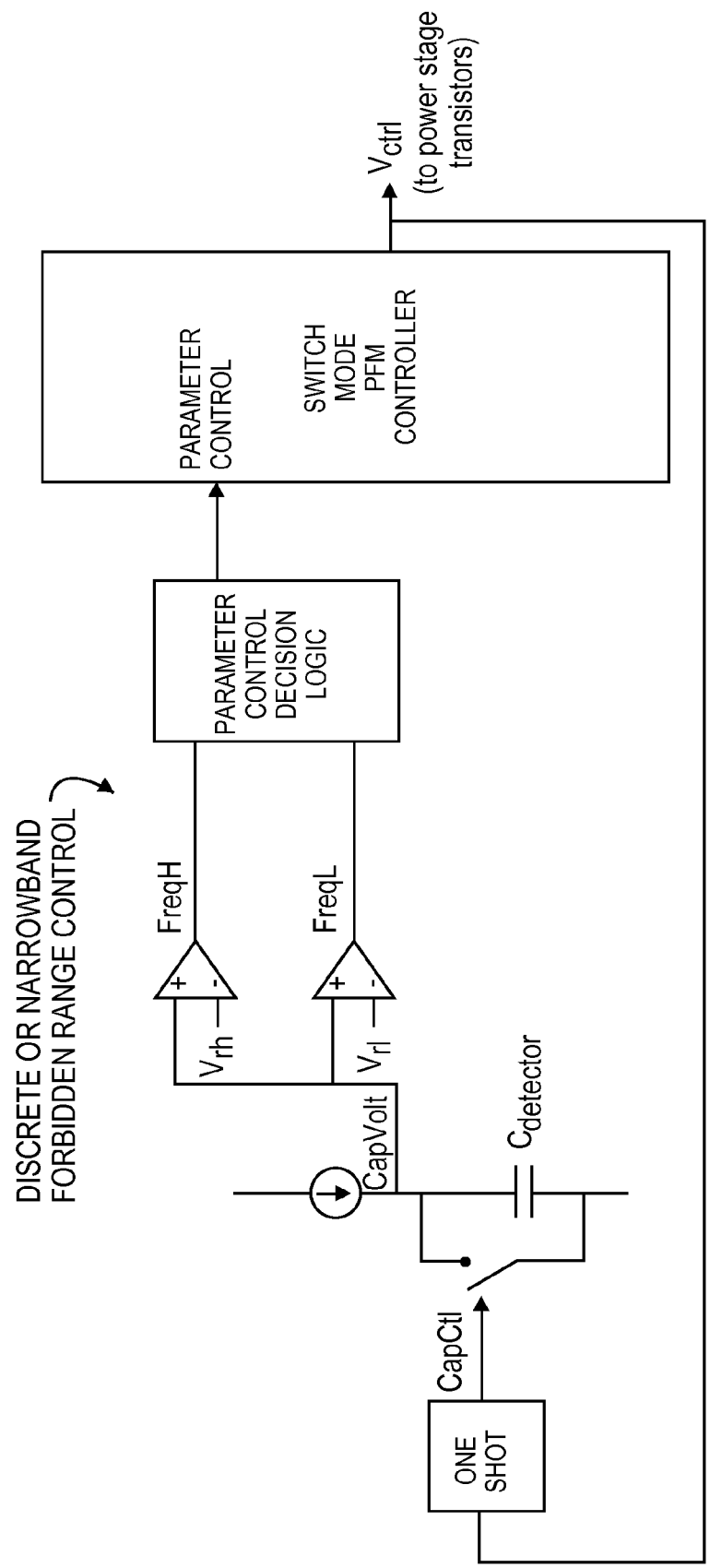
FIG. 5 is a block diagram of a forbidden range control circuit that feeds a parameter control input of a switch mode PFM controller.

In addition, the equations predict that if the peak or maximum inductor current $I_{LM}$ is decreased, the ripple also decreases while $F_s$ increases. Since these equations are expected to be valid, at least to a first order of approximation, Equation 2 suggests that the variation in $F_s$ may be essentially linear relative to load current while the other variables in Equation 2 remain essentially fixed (which is a reasonable assumption in most practical applications. Equation 2 thus explains the waveform shown in FIG. 4. Also from Equation 2, it has been discovered that the peak inductor current $I_{LM}$ may be a very useful input parameter of the switch mode converter, namely one that can be changed, e.g. "offset" as described below using a particular example, during operation of the converter, so as to force the converter to immediately alter its switching frequency $F_s$ by an amount that avoids the target frequency of a nearby sub-system. FIG. 5 shows an example circuit that can achieve such Forbidden Frequency Range Control, during PFM mode operation of a switch mode power converter.

In FIG. 5, it can be seen that the power converter may have a conventional switch mode PFM controller that generates one or more transistor pulse control signals $V_{ctrl}$, depending upon the number of phases in the power stage and the converter topology (e.g., synchronous buck converter). The controller obtains feedback from the output voltage $V_o$ (not shown in FIG. 5) and based on one or more input parameters generates the "next" cycle of $V_{ctrl}$. In accordance with an embodiment of the invention, the controller is modified as shown in FIG. 5 to have a parameter control input that receives a signal from parameter control decision logic. The latter is part of a forbidden range control circuit that automatically determines whether or not a change is needed to the parameter, in order to cause the switching frequency $F_s$ to avoid the operating frequency of a nearby sub-system. The forbidden range control circuit has a frequency monitor whose output, in this example, includes the logic signals FreqH and FreqL that may take on the following three states. Table 1 below defines the meanings of the three states, as being qualitative, not quantitative, indications regarding the latest or present measure of $F_s$. Table 1 also shows the output of the parameter control decision logic in response to each output state of the frequency monitor, as whether or not a parameter change is called for.

TABLE 1

| FreqL | FreqH | Fs is | Change a parameter? |
|---|---|---|---|
| 0 | 0 | higher than Forbidden Range | No |
| 1 | 0 | within Forbidden Range | Yes |
| 1 | 1 | lower than Forbidden Range | No |

The states give the following qualitative, not quantitative, indications about the latest measure of the switching frequency. The first state indicates that $F_s$ is higher than the forbidden range, and that a change in a parameter of the converter is therefore not called for. Another state indicates that $F_s$ is lower than the forbidden range, in which case a change in the parameter is also not called for. In a third state, $F_s$ is found to be within the forbidden range such that a change in the parameter is called for. The parameter control decision logic shown in FIG. 5 responds to the state output from the frequency monitor, namely the logic values of FreqH and FreqL, by indicating a change or no change, to a parameter of the switch mode PFM controller.

The frequency monitor in the example of FIG. 5 is implemented using a window comparator that has an upper threshold voltage $V_{rh}$ and a lower threshold voltage $V_{rl}$, and that has an input which is coupled to receive the capacitor voltage CapVolt of the capacitor $C_{detector}$. A trimmed current source is coupled to charge the capacitor as shown, which is an accurate or reference current source that may be variable but when set, for a particular forbidden frequency range or for a given target frequency, remains accurate. A reset switch is coupled to reset the $C_{detector}$ to a known voltage (e.g., zero volts), in response to a control signal CapCtl derived from $V_{ctrl}$. In this example, the CapCtl is generated by a one-shot in response to receiving $V_{ctrl}$, and thus generates a short $C_{detector}$ reset pulse periodically according to $F_s$. In other words, the capacitor $C_{detector}$ is reset at the switching frequency $F_s$ and its CapVolt is compared to a voltage hysteresis window to generate in this example the three logic states through FreqL, FreqH as mentioned above. This analog circuit approach gives a qualitative yet accurate measure of the switching frequency $F_s$ in relation to a defined forbidden range, in a particularly power efficient manner.

Figure 6:
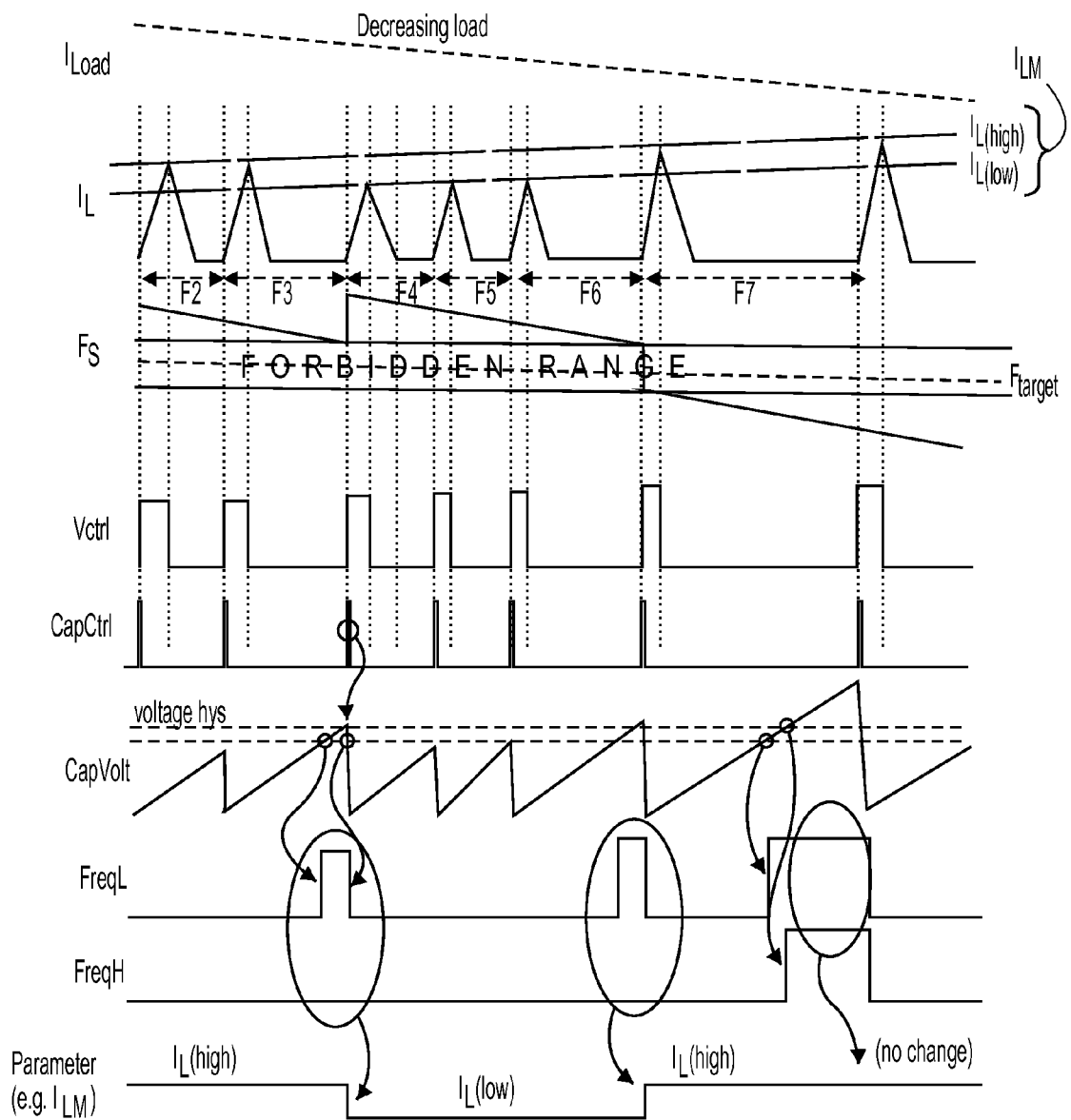
FIG. 6 shows waveforms of a switch mode PFM converter that illustrate how an example input parameter of the converter can be controlled in order to create a frequency dead band, or to avoid a forbidden frequency range, around a target switching frequency.

Operation of the forbidden range control circuit of FIG. 5 may be illustrated using the waveforms of FIG. 6. These are for the situation where the load current $I_{load}$ is decreasing, and as a result the switching frequency $F_s$ is also decreasing simultaneously (in order to achieve regulation of the output voltage $V_o$), by an amount that will cause $F_s$ to undesirably traverse a target frequency $F_{target}$ (without the benefit of the forbidden range control circuit). The target frequency $F_{target}$ may be the fundamental clock frequency or other operating frequency of a nearby clocked sub-system. A predetermined frequency range referred to here as a forbidden frequency range is defined that may be about centered at $F_{target}$. It can be seen that the waveform for $F_s$ essentially skips this forbidden range as the load decreases.

In one embodiment, the forbidden range should be kept relatively narrow so as to reduce the impact of the changes made in the input parameter, on the "normal" operation of the switch mode controller in regulating the output voltage during changing load conditions. For instance, the forbidden range may be no larger than the variation of the operating frequency of the clocked sub-system from its nominal value (here, $F_{target}$), where such variation may be due to manufacturing process, supply voltage and temperature variations (collectively referred to as PVT variation). The PVT variation or other tolerance in the operating frequency of the clocked sub-system may, for example, be found in a data sheet or otherwise reported in a specification of the sub-system by its manufacturer. In another instance, the forbidden range may be defined differently, for example being no larger than a 5% variation of the operating frequency of the clocked sub-system from its nominal value, i.e. $F_{target} \pm 5\%$. Once the forbidden range has been defined, then simulations or laboratory experimentation may easily reveal the needed change in the input parameter that will move $F_s$ out of the forbidden range just enough to provide some level of hysteresis (should the detection process of detecting or monitoring $F_s$ be noisy). In one embodiment, the change in the parameter is less than 10% of its "original value", which is the value of the parameter, being used by the switch mode controller, just prior to $F_s$ coming into the forbidden range.

Returning to FIG. 6, beginning with cycle F2 of $V_{ctrl}$, it can be seen that as the load is decreasing during this cycle, the switching frequency $F_s$ is also decreasing although it has not yet entered the forbidden zone. This is indicated by the values of FreqL, FreqH being both logic zero. The "measurement" of $F_s$ for cycle F2 occurs at the end of the cycle, namely at the second pulse in capacitor control voltage CapCtrl. At that point, the capacitor voltage CapVolt is well below the two threshold levels Vrh, Vrl that define the voltage hysteresis range of the window comparator, such that both FreqL and FreqH are logic zero. Note that as seen in Table 1 above, this indicates that $F_s$ is higher than the forbidden range. This can be understood by recognizing that if $C_{detector}$ (referring back to FIG. 5) is reset sufficiently early, relative to CapVolt reaching the voltage hysteresis thresholds, then $F_s$ is deemed to be higher than the forbidden frequency range. At the end of cycle F3 however, CapVolt reaches the lower voltage threshold Vrl, but not the higher voltage threshold (before it is reset by CapCtrl). This means that $F_s$ has entered the forbidden range. As such, the output of the window comparator is FreqL=logic 1, FreqH=logic 0. The accuracy of such a technique is appreciable, given that the behavior of CapVolt and CapCtrl can be simulated and the voltage reference levels $V_{rl}$ and $V_{rh}$ can then be determined on that basis to define the forbidden range, to high accuracy. Accordingly, an accurate yet qualitative indication of whether or not $F_s$ is above or within the forbidden range can be achieved.

Still referring to the waveforms in FIG. 6, the first occurrence of the state FreqL=logic 1, FreqH=logic 0 is when CapVolt has crossed into the forbidden range, at the end of cycle F3. A decision is made at this point that a parameter change is needed. In the example of FIG. 6, the parameter is the inductor current limit $I_{LM}$. Here, $I_{LM}$ is changed from an original, higher value to a lower value. Such an offset or step in this parameter causes an upward jump in the switching frequency $F_s$ (as per Equation 2 above), for the same load current. As such, $F_s$ will go out of the forbidden range starting with cycle F4, but will continue to decrease as a function of the continually decreasing load current.

At the next instance of CapCtrl pulsing, namely at the end of cycle F4, $F_s$ is still above the forbidden range such that FreqL, FreqH are back to their 0,0 state, indicating no change in the parameter is needed. This continues at the end of cycle F5. However, at the end of cycle F6, $F_s$ has dropped into the forbidden range again, and this is properly detected as FreqL, FreqH being 1,0. Note that this is the second, consecutive time that $F_s$ has come into the forbidden range (during the continuously decreasing run in $F_s$). This time however, a decision is made to change the parameter $I_{LM}$ back to its original, higher value, $I_{L(high)}$. This results in a downward jump in $F_s$, at the start of cycle F7. This approach of controlling $F_s$ to skip the forbidden range by an upward jump and then a downward jump (during decreasing load current) helps maintain more efficient operation of the power converter, by limiting the change in the parameter to only two distinct levels, and also limiting the change in $F_s$ so that it resumes its normal excursion or slope (as the load continues to decrease).

Now, during cycle F7, CapVolt exceeds both thresholds of the window comparator, such that FreqL=1, FreqH=1. This means that the switching frequency $F_s$ is below than the forbidden range. In other words, the pulsing of CapCtrl at the end of interval F7 does not occur until after CapVolt has exceeded both of the voltage thresholds of the comparator. In that case, the decision is then made that there be no change to the parameter, because the switching frequency $F_s$ is below the forbidden range.

While FIG. 6 shows the behavior of the frequency monitor and the parameter decision control logic of FIG. 5 for the case where the load current is decreasing, the sequence described above in connection with FIG. 6 informs what happens at the frequency monitor when the load is increasing (and the switching frequency $F_s$ is also increasing). To explain, $F_s$ starts by being lower than the forbidden range and steadily increases until it reaches the forbidden range, at which point the output state is once again FreqL=1, FreqH=0. That results in the decision that a parameter change is needed. In one embodiment, the parameter change at this point is such that the switching frequency $F_s$ makes an upward jump that is sufficiently high to avoid the forbidden range. This change in the parameter may be the same as the change in the parameter that was signaled when the load was decreasing. Now, as the load current continues to increase following the first instance of $F_s$ entering the forbidden range, the frequency monitor will continue to output the state FreqL=0, FreqH=0, such that with increasing load, there is no need to make a change in the parameter. Accordingly, that portion of the $F_s$ waveform (in the case of increasing load current) will differ from that of FIG. 6 in that $F_s$ will continue to increase without a further jump (following the first instance of skipping the forbidden range). This means that the parameter control decision logic may need to "remember" the sequence of output states from the frequency monitor, in order make the correct decision regarding the parameter changes, during both increasing and decreasing load current conditions.

Figure 7:
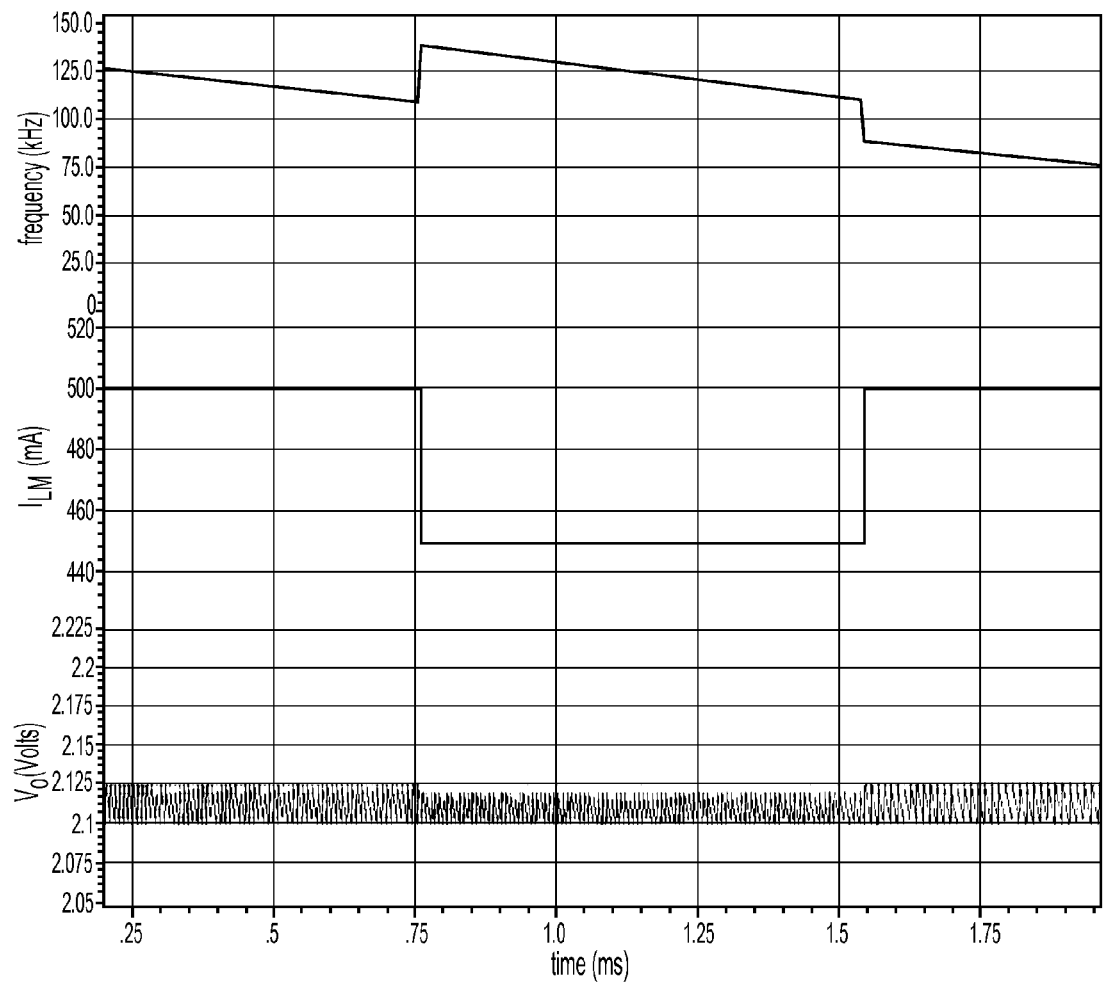
FIG. 7 shows the results of simulation of example circuitry that is in accordance with FIG. 5, and in particular how a target switching frequency (here shown at 100 KHz) is avoided without significantly impacting a regulated output dc voltage.

Having described a process for operating a PFM switch mode power converter including a circuit for controlling the switching frequency of the controller, the following additional aspects regarding such a circuit should be noted. First, while the description above including Equation 2 and the waveforms in FIG. 6 refer to the parameter that is being changed as being the inductor current limit $I_{LM}$, a similar result can be achieved by selecting a different input parameter, depending upon the topology of the PFM controller. Examples include transistor control pulse on-time, transistor control pulse off-time, and transistor control burst mode interval or burst count. Also, the amount of the change in the parameter, needed to cause $F_s$ to skip the forbidden range, may depend on the topology of the controller in addition to the width of the forbidden range. In most cases, it is expected that the forbidden range should be no larger than a 10% variation of the operating frequency of a nearby sensitive clock sub-system from its nominal value (e.g., $F_{target}$), where the nominal value of the operating frequency may be a clock frequency that is given by a specification or design value set by a designer or manufacturer of that sub-system. For instance, FIG. 7 illustrates a simulation of an example showing the variation in switching frequency $F_s$ with decreasing load current, and in particular how $F_s$ avoids a target frequency of 100 kHz and a forbidden range of about 90 kHz-110 kHz, using an inductor current limit offset of 50 mA from an original value of 500 mA.

Moreover, while the approach depicted in FIG. 6 to change the parameter in order to avoid the forbidden range was to cause an upward jump in the switching frequency, upon the initial entry into the forbidden range, and an alternative may be to change the parameter in the reverse direction so that the switching frequency jumps downward (over the forbidden range). In general, the approach that is actually adopted for a particular power converter should be evaluated in view of other specifications such as its desired power efficiency and output voltage ripple. Note for instance the impact on the output voltage $V_o$ as seen in the example simulation of FIG. 7, when the inductor current limit is dropped. This is considered a relatively small and acceptable impact on the ripple, in many instances. It should be noted that power efficiency tends to decrease with increasing $F_s$, while the output voltage ripple will decrease. Such choices and trade offs will help decide what is the appropriate solution for any particular design, for example, whether an increase in the inductor current limit should be adopted, instead of a decrease, in order to avoid a forbidden range.

While certain embodiments have been described and shown in the accompanying drawings, it is to be understood that such embodiments are merely illustrative of and not restrictive on the broad invention, and that the invention is not limited to the specific constructions and arrangements shown and described, since various other modifications may occur to those of ordinary skill in the art. For example, although the above description refers to a single forbidden range (and a single target frequency) being avoided, by controlling the behavior of a PFM switch mode power converter, the same approach may be used for multiple target frequencies such that multiple, non-overlapping forbidden ranges are avoided. In that case, the same frequency monitor and parameter control decision logic may be re-used, by simply changing, for example, the value of the trimmed current source and/or the window comparator reference voltages, to match the new forbidden range. It can be expected that there may be several sub-systems operating at different clock frequencies that are particularly sensitive to EMI from the power converter. Some of these may lead to multiple, overlapping forbidden ranges being defined, in which case the frequency monitor described above may be modified with additional comparators in order to simultaneously detect incursions into the overlapping forbidden ranges. The description is thus to be regarded as illustrative instead of limiting.

What is claimed is:

1. A process for operating a pulse frequency modulation (PFM) switch mode power converter in a battery powered portable electronic device, comprising:
monitoring a switching frequency of a switch mode power converter that is operating in PFM mode in a battery powered portable electronic device;
comparing the switching frequency with a predetermined frequency range that contains a clock frequency of a clocked sub-system in the portable electronic device, wherein the predetermined frequency range is no larger than variation of the clock frequency of the clocked sub-system from its nominal value, due to manufacturing process, supply voltage, and temperature variations; and
in response to the switching frequency coming into the predetermined frequency range, changing a parameter of the power converter from an original value, thereby causing the switching frequency to go out of the predetermined frequency range.

2. The process of claim 1 wherein the parameter represents one of an inductor current limit, a transistor control pulse on-time, a transistor control pulse off-time, and a transistor control burst mode interval or count.

3. The process of claim 1 wherein the change in the parameter of the power converter is less than 10%.

4. The process of claim 1 wherein the predetermined frequency range is no larger than a 5% variation of the clock frequency of the clocked sub-system from its nominal value.

5. The process of claim 4 wherein the change in the parameter of the power converter is less than 10%.

6. The process of claim 1 wherein the change in the parameter of the power converter is less than 10%.

7. The process of claim 1 further comprising, in response to the switching coming into the predetermined frequency range a second, consecutive time, changing the parameter back to the original value.

8. An electronic device comprising:
a housing having installed therein
a plurality of sub-systems including a clocked sub-system having an operating frequency; and
a switch mode PFM power converter whose switching frequency is compared with a predetermined frequency range that contains the operating frequency of the clocked sub-system, and in response to the switching frequency coming into the predetermined frequency range, a parameter of the power converter is changed from an original value, so as to cause the switching frequency to go out of the predetermined frequency range, wherein the predetermined frequency range is no larger than variation of the operating frequency of the clocked sub-system from its nominal value, due to manufacturing process, supply voltage, and temperature variations.

9. The electronic device of claim 8 wherein in response to the switching frequency coming into the predetermined frequency range a second, consecutive time, the parameter is changed back to the original value.

10. The electronic device of claim 8 wherein the change in the parameter of the power converter is less than 10%.

11. The electronic device of claim 8 wherein the predetermined frequency range is no larger than a 5% variation of the operating frequency of the clocked sub-system from its nominal value.

12. The electronic device of claim 11 wherein the change in the parameter of the power converter is less than 10%.

13. The electronic device of claim 8 wherein the change in the parameter of the power converter is less than 10%.

14. A process for operating a pulse frequency modulation (PFM) switch mode power converter in a battery powered portable electronic device, comprising:
monitoring a switching frequency of a switch mode power converter that is operating in PFM mode in a battery powered portable electronic device; and
in response to the switching frequency coming into a predetermined frequency range that is defined by a predetermined clock frequency of a clocked sub-system of the portable electronic device and a predetermined clock frequency tolerance band of the clocked sub-system, changing a parameter of the power converter from an original value, thereby causing the switching frequency to go out of the predetermined frequency range.

15. The process of claim 14 wherein the parameter represents one of an inductor current limit, a transistor control pulse on-time, a transistor control pulse off-time, and a transistor control burst mode interval or count.

16. The process of claim 15 wherein the change in the parameter of the power converter is less than 10%.

17. The process of claim 14 wherein the change in the parameter of the power converter is less than 10%.

18. The process of claim 14 wherein the predetermined frequency range is no larger than a 5% variation from the predetermined clock frequency.

19. The process of claim 14 further comprising, in response to the switching frequency coming into the predetermined frequency range a second, consecutive time, changing the parameter back to the original value.

20. An electronic device comprising:
a housing having installed therein
    a plurality of sub-systems including a clocked sub-system having an operating frequency; and
    a switch mode PFM power converter whose switching frequency is compared with a predetermined frequency range that is defined by the operating frequency of the clocked sub-system and a predetermined clock frequency tolerance band of the clocked sub-system, and in response to the switching frequency coming into the predetermined frequency range, a parameter of the power converter is changed from an original value, so as to cause the switching frequency to go out of the predetermined frequency range.

21. The electronic device of claim 20 wherein in response to the switching frequency coming into the predetermined frequency range a second, consecutive time, the parameter is changed back to the original value.

22. The electronic device of claim 20 wherein the change in the parameter of the power converter is less than 10%.

23. The electronic device of claim 20 wherein the parameter represents one of an inductor current limit, a transistor control pulse on-time, a transistor control pulse off-time, and a transistor control burst mode interval or count.

24. The electronic device of claim 23 wherein the change in the parameter of the power converter is less than 10%.

* * * * *